(12) United States Patent
Elbling et al.

(10) Patent No.: US 9,679,425 B2
(45) Date of Patent: Jun. 13, 2017

(54) CONTROL AND MONITORING SYSTEM AND METHOD FOR ACCESS TO A RESTRICTED AREA

(71) Applicant: DIGICON S. A. CONTROLE ELETRÔNICO PARA MECÂNICA, Gravataí (BR)

(72) Inventors: Peter Richard Elbling, Porto Alegre (BR); Mário Arand, Gravataí (BR)

(73) Assignee: DIGICON S.A. CONTROLE ELECTRÔNICO PARA MECÂNICA, Gravataí-RS (BR)

( * ) Notice: Subject to any disclaimer, the term of this patent is extended or adjusted under 35 U.S.C. 154(b) by 0 days.

(21) Appl. No.: 14/760,257

(22) PCT Filed: Aug. 20, 2014

(86) PCT No.: PCT/BR2014/000291
§ 371 (c)(1),
(2) Date: Jul. 10, 2015

(87) PCT Pub. No.: WO2016/019444
PCT Pub. Date: Feb. 11, 2010

(65) Prior Publication Data
US 2016/0284142 A1 Sep. 29, 2016

(30) Foreign Application Priority Data
Aug. 8, 2014 (BR) .......................... 1020140196250

(51) Int. Cl.
*B60R 25/00* (2013.01)
*G07C 9/00* (2006.01)
(Continued)

(52) U.S. Cl.
CPC .......... *G07C 9/00071* (2013.01); *E06B 11/08* (2013.01); *G01B 11/14* (2013.01);
(Continued)

(58) Field of Classification Search
CPC ..... G07C 9/00071; E06B 11/08; G01B 11/14; G01B 15/00; G01B 17/00
(Continued)

(56) References Cited

U.S. PATENT DOCUMENTS 4,849,737 A   7/1989  Kirihata et al.
5,845,692 A   12/1998 Kellem et al.
(Continued)

FOREIGN PATENT DOCUMENTS

CN   101847278 A   9/2010
CN   103295301 A   9/2013
(Continued)

OTHER PUBLICATIONS

International Search Report and Written Opinion for PCT/BR2014/000291, mailed Jan. 7, 2015.

*Primary Examiner* — Ojiako Nwugo
(74) *Attorney, Agent, or Firm* — Hauptman Ham, LLP; Rachel K. Pilloff; Sean A. Passino

(57) ABSTRACT

We describe a control and monitoring system and method for access to a restricted area, such as mass transport systems (subways, trains, airports, ships and others), commercial buildings, schools, factories, datacenters, and other places with people moving, composed of a Processing Unit (10) that receives information both from a User Authentication Device (20) and an Image Capture Device (40). The Processing Unit (10) processes this information determining user category as well as user location, speed and direction of movement within a Gated Area (GA). In turn, the Processing Unit (10) triggers one or more Bars of Luminous Elements (31) arranged in Barriers (30) limiting a Gated Area (GA), giving every user (Authorized User [AU], Unauthorized User [UU] or Special User [SU]) a User Category Window (311, 312 or 313) that follows the movement of the user within the Gated Area (GA). A Blocking Device (50) can be activated by the Processing Unit (10) to be partially or fully closed or opened and at a speed proportional to the location, velocity and direction of movement of the user within the Gated Area (GA).

14 Claims, 10 Drawing Sheets

(51) Int. Cl.
*E06B 11/08* (2006.01)
*G01B 15/00* (2006.01)
*G01B 17/00* (2006.01)
*G01B 11/14* (2006.01)
*G01B 11/00* (2006.01)
*G07C 9/02* (2006.01)

(52) U.S. Cl.
CPC ............ *G01B 15/00* (2013.01); *G01B 17/00* (2013.01); *G07C 9/00* (2013.01); *G01B 11/002* (2013.01); *G07C 9/02* (2013.01)

(58) Field of Classification Search
USPC ............ 340/5.1–5.8, 531, 571, 568.1, 573.3, 340/573.4, 825.3, 825.31, 825.34, 825.36, 340/825.74
See application file for complete search history.

(56) References Cited

U.S. PATENT DOCUMENTS

| | | | |
|---|---|---|---|
| 6,268,797 B1* | 7/2001 | Berube | G08B 15/004 340/5.64 |
| 6,967,674 B1 | 11/2005 | Lausch | |
| 7,331,522 B2 | 2/2008 | Sandoval et al. | |
| 8,009,013 B1* | 8/2011 | Hirschfeld | G07C 9/00103 235/375 |
| 9,122,908 B2* | 9/2015 | Lin | G06K 9/00201 |
| 2003/0062997 A1* | 4/2003 | Naidoo | G08B 13/19656 340/531 |
| 2004/0153671 A1* | 8/2004 | Schuyler | G07C 9/00111 726/9 |
| 2006/0101716 A1 | 5/2006 | Vandyck et al. | |
| 2008/0086758 A1* | 4/2008 | Chowdhury | G07C 9/00103 726/2 |
| 2010/0245087 A1 | 9/2010 | Gerner et al. | |
| 2011/0291798 A1* | 12/2011 | Schibuk | G07B 15/00 340/5.61 |
| 2012/0139694 A1* | 6/2012 | Pineau | G07C 9/00166 340/5.6 |
| 2013/0214898 A1* | 8/2013 | Pineau | G06F 21/32 340/5.6 |

FOREIGN PATENT DOCUMENTS

| | | |
|---|---|---|
| EP | 1130549 A2 | 9/2001 |
| FR | 2739203 A1 | 3/1997 |
| JP | 2006209728 A | 8/2006 |
| WO | 98/08208 A2 | 2/1998 |
| WO | 2013/135922 A1 | 9/2013 |

* cited by examiner

CONTROL AND MONITORING SYSTEM AND METHOD FOR ACCESS TO A RESTRICTED AREA

FIELD OF THIS INVENTION

This invention describes a control and monitoring system and method for access to a restricted area, such as mass transit systems (metro stations, train stations, airports, ports and others), commercial buildings, schools, factories, data centers and other places where the movement of people into restricted areas must be controlled. It more specifically comprises a monitoring and access control system with a processing unit which receives information from a user authentication unit and an image capture device and in turn activates one or more bars of luminous elements arranged in barriers which limit a Gated Area. Each user category (Authorized User, Unauthorized User or Special User) is associated with an indicative window of a specific and programmed color that accompanies the movement of the user within the Gated Area, facilitating the action of security agents with regard to visual identification and eventual approach to an Unauthorized User and permission to entry into the Restricted Area for Authorized and Special Users.

BACKGROUND OF THIS INVENTION

In applications requiring the control of the flow of people, multiple ways of validating or preventing unauthorized access are used. The most common are blocking devices known as turnstiles consisting of mechanical arms arranged in angles of 90° (four arms) or 120° (three arms). In this case, users interact physically with the arms, pushing them so the device can rotate to allow passage of the user through the turnstile, if properly validated. The turnstile can either be rotated physically by the user or can be rotated by a motorized mechanism installed in the turnstile. If the passage is not validated, the turnstile mechanism blocks the rotation of the arms thereby impeding the passage of an Unauthorized User.

Document US2006101716 describes an automatic gate that allows or prevents access to a restricted area or to a transport vehicle. Said automatic gate is equipped with flaps rotating between a closed position, in which the flap forms a barrier preventing the passage of an unauthorized user, and an open position allowing the passage of a person who has been validated through the insertion of a ticket in an authentication device. Such automatic gates dispense the physical interaction of the user with the blocking device.

In these state of the art solutions, where the user's physical contact with the equipment is not necessary, the activation of sliding doors or flaps, for blocking or allowing users' access to a restricted area, is usually performed by infrared optical sensors monitoring the user's passage, sending this information to a processing unit which in turn opens the doors or flaps when the passage is validated or maintaining them closed when not validated.

Document CN103295301 describes an access control system equipped with an identification module that includes an infrared sensor, which identifies the user when approaching a gated area.

In the case of devices in which the user does not have physical contact with the equipment, two main characteristics are explored: the blockage of passage of users without permission and the monitoring of "tailgate" or "piggy-back" users, that is, those who follow closely behind a user with authorized access to gain unauthorized entry to a restricted area.

When an unauthorized user enters together with an authorized user, the system detects the unauthorized user and automatically activates the blocking elements or mechanism, sometimes even preventing the entry of authorized users, which may even have been overtaken by the unauthorized user. The closure of the blocking mechanism is normally accompanied by sonorous alarms and/or visual warnings, which in turn trigger security teams. However, in some circumstances, security personnel cannot quickly and accurately identify the unauthorized user.

Document WO2013135922 describes an access control device applicable to equipment with a barrier in order to detect the passage of unauthorized users, taking advantage of the valid access of an authorized users (i.e. in this case, unauthorized users are "tailgaters" or "piggy-backers"). This device comprises a people counting sensor, sonorous and visual alarms, and a means for spraying a dye or powder on the unauthorized user, where such spray or dye can be easily removed or cleaned.

Document CN101847278 describes a system and a method for adjusting the level of safety and signaling in controlled areas in order to detect the presence of one or more individuals to determine if a user is an authorized or unauthorized individual, or an intruder.

Document U.S. Pat. No. 5,845,692 describes an access system that allows the passage of authorized individuals through a door and where unauthorized individuals are prevented from reaching the restricted area by being automatically redirected to an unrestricted area for further processing. Such procedure avoids activating the blocking device thereby maintaining the flow of authorized individuals. The system includes visual and sonorous alarms.

Document JP2006209728 describes a device for detection of unauthorized entry and a detection method to prevent the unauthorized entry of an unauthorized person accompanying a person with authorized permission (i.e. "tailgaters" or "piggy-backers"). In this entry control system, an individual authentication device is installed in an authentication room closed by a first door allowing entry from the outside and a second door allowing entry to the control section, and opening/closing of the second door is controlled on the basis of a collation result by the individual authentication device to prevent the unauthorized entry to the control section. The entry control system controlling the entry to the control section has: a camera installed in the upper part (ceiling) of the authentication room installed with the authentication device; an unauthorized entry detection device performing image processing on the basis of a video of the whole inside of the authentication room photographed by the camera, and deciding "absence", "authorized entry", or "unauthorized entry", for a state inside the authentication room; and a controller controlling the opening/closing of the first door and the second door on the basis of a decision result of the unauthorized entry detection device and the collation result of the individual authentication device Therefore, state of the art access control systems feature visual and/or sonorous alarms to alert the entry or attempted entry of unauthorized users in the restricted area, or the attempt of entry by "tailgate" or "piggy-back" users (those who are not authorized to enter, but attempt to do so by closely following an authorized user). However, these state of the art systems do not visually follow the user(s) movement within a gated area (i.e. the movement between the authentication device and the blocking device), so it is not possible to precisely identify the unauthorized user(s) who is (are) within the gated area.

Furthermore, state of the art access control systems identify the user's category only at the authentication device, so that authorized users with a special condition (such as, but not limited to, senior citizens, handicapped users, users exempt from payment, students, users with different fare conditions, visitors, third party workers, service providers, amongst others) are not precisely identified as they move within the Gated Area, resulting in attendance delays by security personnel, slow downs in the flow, and sometimes stoppage of flow at the blocking device.

Thus, this invention has as an object a Control and Monitoring System and Method for Access to a Restricted Area with a Gated Area prior to the Restricted Area. A user authentication module or device is placed at the entrance of the Gated Area which sends authentication and user category (Authorized User, Unauthorized User or Special User) data to a processing unit which in turn triggers the creation of an indicative window composed of luminous elements situated on barriers where such indicative windows have unique colors associated with each user category. This indicative window follows the movement of each user within the Gated Area, based on information captured by an image capture device and processed by a processing unit. If more than one user is in the Gated Area, each individual user will have a corresponding indicative window for that user's category. The indicative window(s) signal(s) to security agents a possible incident so that action may be taken. The imaging device constantly identifies the presence of one or more users within the gated area, transferring this information to the processing unit, which calculates the users' position, speed and direction of movement, and in turn controls the closing or opening speed of a blocking device in proportion to the speed, location and direction of movement of Unauthorized Users, resulting in partial or total closure or partial or total opening of the blocking device.

SUMMARY

The invention provides a monitoring and control system and method for access to restricted areas, which features an electronic processing unit connected to a user authentication device that authenticates, or not, a user and determines a user category for that user. This information is sent to the processing unit which in turn activates luminous elements arranged in the barriers of a Gated Area, creating visual indicative windows of the user category (Authorized User, Unauthorized User and Special User) that follow the movements of the corresponding user within the Gated Area. At the end of the Gated Area, and just before the entrance to the Restricted Area, is a blocking device, which is controlled by the processing unit to open or close, fully or partially.

The invention provides a control and monitoring system and method for access to a restricted area which features an Image Capture Device with an imaging range defined by an Imaging Area which monitors a user's presence within the Gated Area and sends this information to a processing unit which calculates the location, speed and direction of movement of the user within the Gated Area. Based on the processed information, the processing unit activates an indicative window by way of luminous elements situated in barriers which delimit a Gated Area. Such indicative windows are illuminated in specific colors for each user category (Authorized User, Unauthorized User, and Special User). These indicative windows follow the movement of the respective user within the Gated Area, both towards or away from the Restricted Area, based on constantly updated presence information sent by the image capture device to the processing unit.

The invention provides a control and monitoring system and method for access to a restricted area that incorporates a Blocking Device located immediately prior to the Restricted Area, whose partial or complete closing or opening and the speed of such partial or complete closing or opening is controlled by the processing unit, in proportion to the speed of passage, location and direction of movement of a user detected by an image capture device within the Gated Area. Such partial or complete closing or partial or complete opening of the Blocking Device is usually executed for Unauthorized Users as they approach the Restricted Area (partial or complete closing of the Blocking Device) or as they move away from the Restricted Area (partial or complete opening of the Blocking Device). The blocking device is usually kept open for authorized users or special users.

The invention provides a control and monitoring system and method for access to a restricted area, which gives every user category (Authorized User, Unauthorized User, Special User), previously identified by the user authentication device, a unique and pre-determined visual identification for that user category, in the form of an indicative window with a specific color for that category of user, composed of luminous elements arranged in the barriers which delimit the Gated Area. Such indicative windows follow the movement of the user within the Gated Area, facilitating the action of security officers by providing accurate visual identification of Unauthorized Users or Special Users, while permitting unhindered entrance to the Restricted Area for Authorized Users and other Special Users.

The invention provides a control and monitoring system and method for access to a restricted area, which provides an indicative window consisting of luminous elements arranged in the barriers of the Gated Area that follow the movement of the user within the Gated Area, even in situations where a first user overtakes a second user of the same or a different category, in which case the first user's indicative window transposes the indicative window of the second user being overtaken. In such cases the indicative window of the first user and second user continue to follow the corresponding user even during and after the process of overtaking has occurred.

The invention provides a control and monitoring system and method for access to a restricted area, allowing security officers or gatehouse staff a fast and precise identification and eventual segregation of Unauthorized or Special Users moving through the Gated Area towards the Restricted Area.

DETAILED DESCRIPTION OF THE INVENTION

Figure 1:
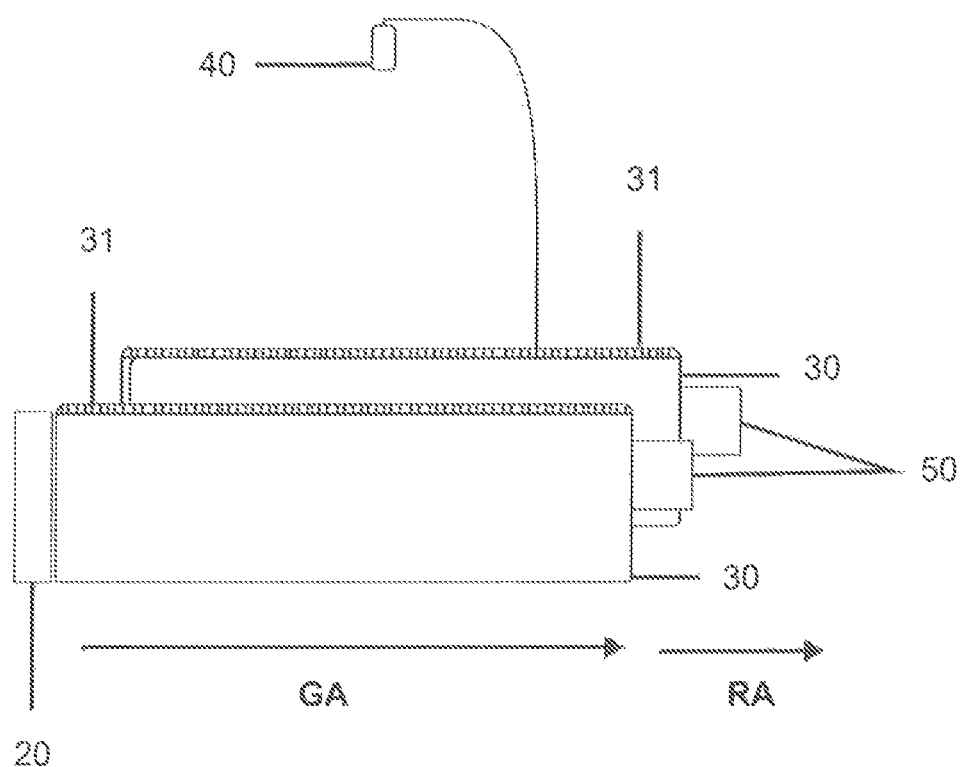
FIG. 1 shows a representation of the control and monitoring system and method for access to a Restricted Area (RA), showing the Gated Area (GA) limited by Barriers (30), each Barrier (30) equipped with a Bar of Luminous Elements (31), the User Authentication Unit (20), usually located at the entrance of the Gated Area (GA), the Image Capture Device (40) and the Blocking Device (50), usually positioned at the entrance to the Restricted Area (RA).

For the purposes of this invention, the following terms are conceptualized:

"Gated Area" (GA) is and area laterally bounded by Barriers (30) each equipped with a Bar of Luminous Elements (31). This Gated Area (GA) is positioned just before a Restricted Area (RA).

"Restricted Area" (RA) comprises an area for access only to Authorized Users (AU) and Special User (SU) previously enrolled in an User Authentication Device (20) located at the entrance of the Gated Area (GA). A Blocking Device (50) can be positioned immediately before the Restricted Area (RA) which allows entry to the Restricted Area (RA) by Authorized Users (AU) and/or Special Users (SU) and prevents access to the Restricted Area (RA) by Unauthorized Users (UU).

"Authorized User" (AU) comprises the user category that is authorized for entry into the Restricted Area (RA). Authorization is given by the User Authentication Device (20), usually located at the entrance of the Gated Area (GA).

"Special User" (SU) comprises an Authorized User that presents a specific condition of access. Examples of such Special Users (SU) include, but are not limited to, senior citizens, handicapped users, user exempt from payment, users with different fare structures, visitors, service providers, and others. Special Users (SU) are authorized by the User Authentication Device (20), usually located at the entrance of the Gated Area (GA), for entry into the Restricted Area (RA). The User Category Window (313) of Special Users (SU) can be programmed/attributed to have a specific color assigned to the Special User (SU) category or, if more detailed identification is necessary, a specific color can be programmed/attributed for each different type (senior citizens, handicapped users, etc.) of Special User (SU), such colors being different from those of Authorized Users (AU) and Unauthorized Users (UU). Such visual identification facilitates the surveillance by the security officer.

"Unauthorized User" (UU) comprises a user not unauthorized by the User Authentication Device (20), usually located at the entrance of the Gated Area (GA), or the user who has not identified himself at the User Authentication Device (20). Unauthorized Users (UU) are not allowed entry into the Restricted Area (RA).

"Imaging Area" comprises the imaging range of the Image Capture Device (40) and is partially defined by the Imaging Angle of the Image Capture Device (40). The Imaging Area includes the Gated Area (GA) and certain adjacencies.

An indicative luminous window marking the category and position of the user within the Gated Area (GA), is in this document referred to as the "User Category Window" (311, 312 or 313), and comprises a window consisting of one or more luminous elements of the Bar of Luminous Elements (31) located on the Barriers (30). The User Category Window (311, 312, 313) follows the displacement of the user within the Gated Area (GA) with the luminous indication of the user category: Authorized user (AU) with User Category Window (311), Unauthorized User (UU) with User Category Window (312), and Special User (SU) with User category Window (313). Each User Category Window (311, 312, 313) has a specific color programmed or attributed to that User Category Window (311, 312, 313).

The control and monitoring system and method for access to a restricted area comprises a Gated Area (GA) before a Restricted Area (RA). This Gated Area (GA) is limited by Barriers (30) with Bars of Luminous Elements (31) that are activated by a Processing Unit (10) that receives, or not, an authentication and user category type from the User Authentication Device (20). The Image Capture Device (40) constantly identifies the presence of the user(s) within the Gated Area (GA) and sends such presence information to the Processing Unit (10) which calculates the location, speed and direction of movement of the user(s) within the Gated Area (GA). In turn, the Processing Unit (10) activates a User Category Window (311, 312, 313) by way of the Bar of Luminous Elements (31) located in the Barriers (30) in a color stipulated for the user category identified by the User Authentication Device (20): Authorized User (AU) with specific User Category Window (311); Unauthorized User (UU) with specific User Category Window (312); and Special User (SU) with specific User Category Window (313). Based on information received from the Processing Unit (10) The User Category Window (311, 312, 313) follows the movement of the corresponding user within the Gated Area (GA), signaling possible incidents to the security agents so that they can take action.

Figure 2:
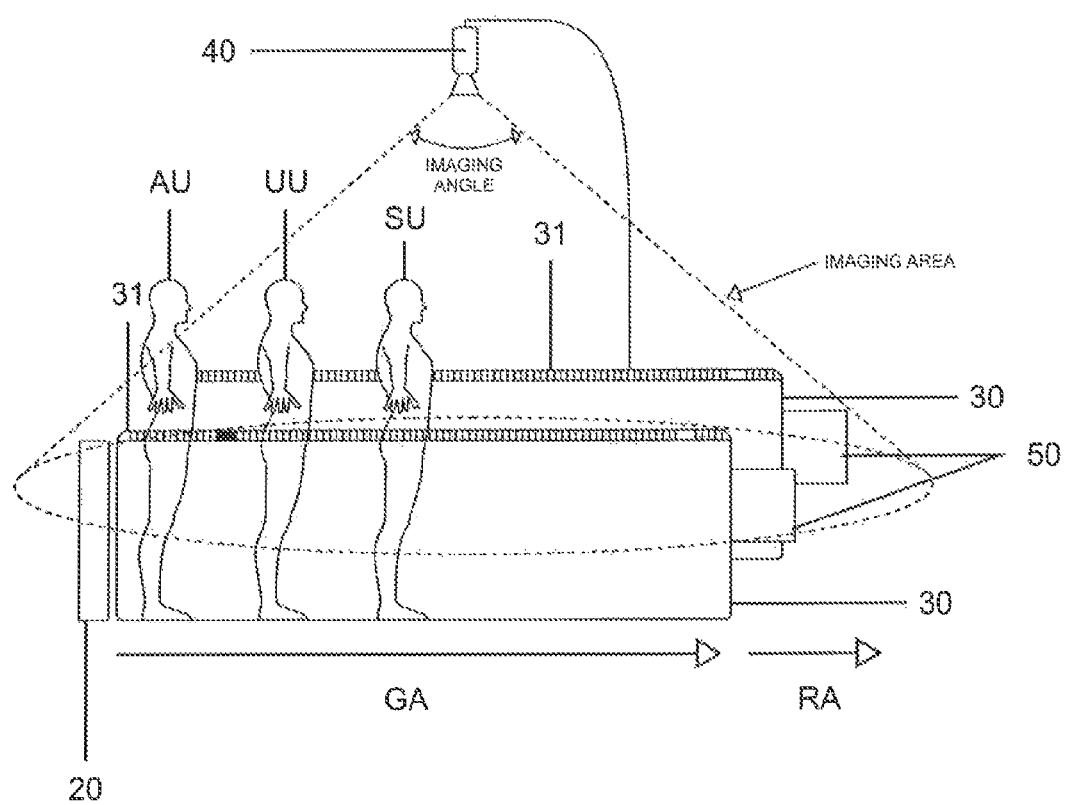
FIG. 2 shows a representation of the Imaging Angle and the Imaging Area of the Image Capture Device (40), highlighting the monitoring limits or area, as well as evidencing the movement of an Authorized User (AU), an Unauthorized User (UU), and a Special User (SU) within the Gated Area (GA).
Figure 3:
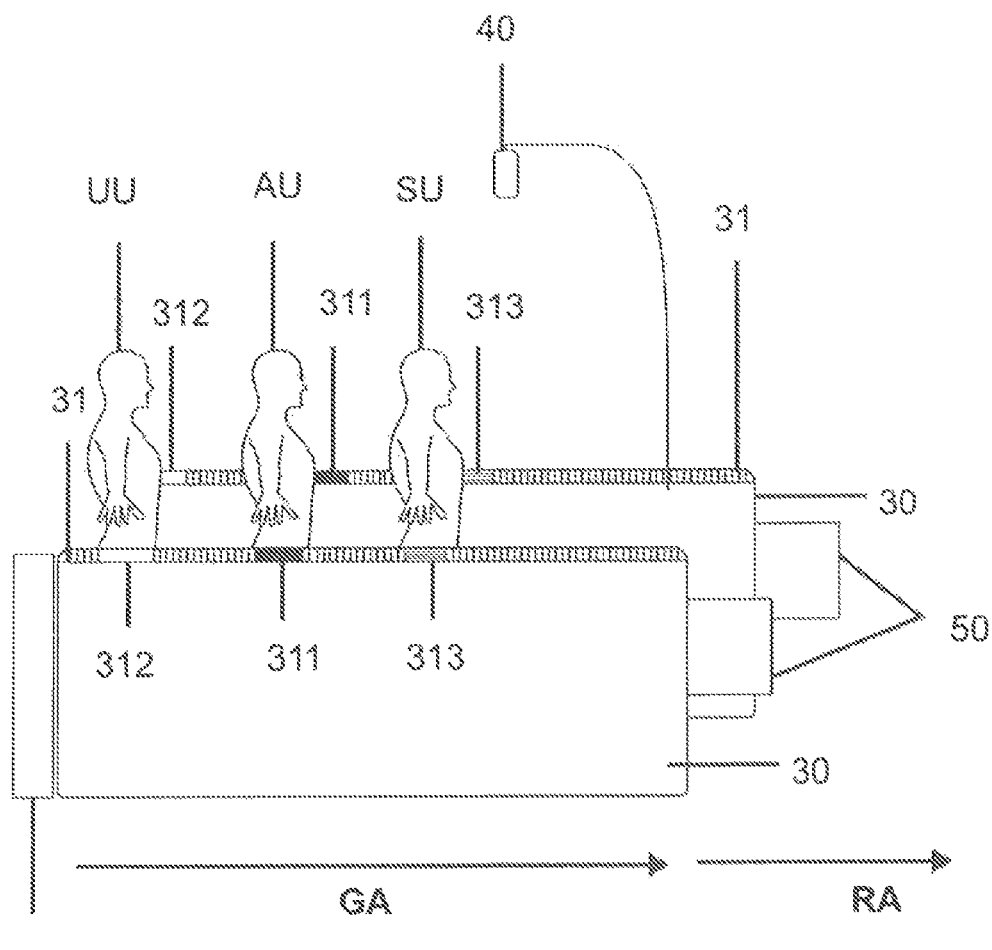
FIG. 3 shows the representation of the different types of user categories—Authorized User (AU), Unauthorized User (UU) and Special User (SU)—moving within the Gated Area (GA). Each user category is followed by their respective User Category Window (311 for Authorized Users [AU], 312 for Unauthorized Users [UU], 313 for Special Users [SU]). A specific color can be programmed/attributed to each User Category Window (311, 312, 313) depending on the corresponding user category (AU, UU, SU) moving within the Gated Area (GA).
Figure 4:
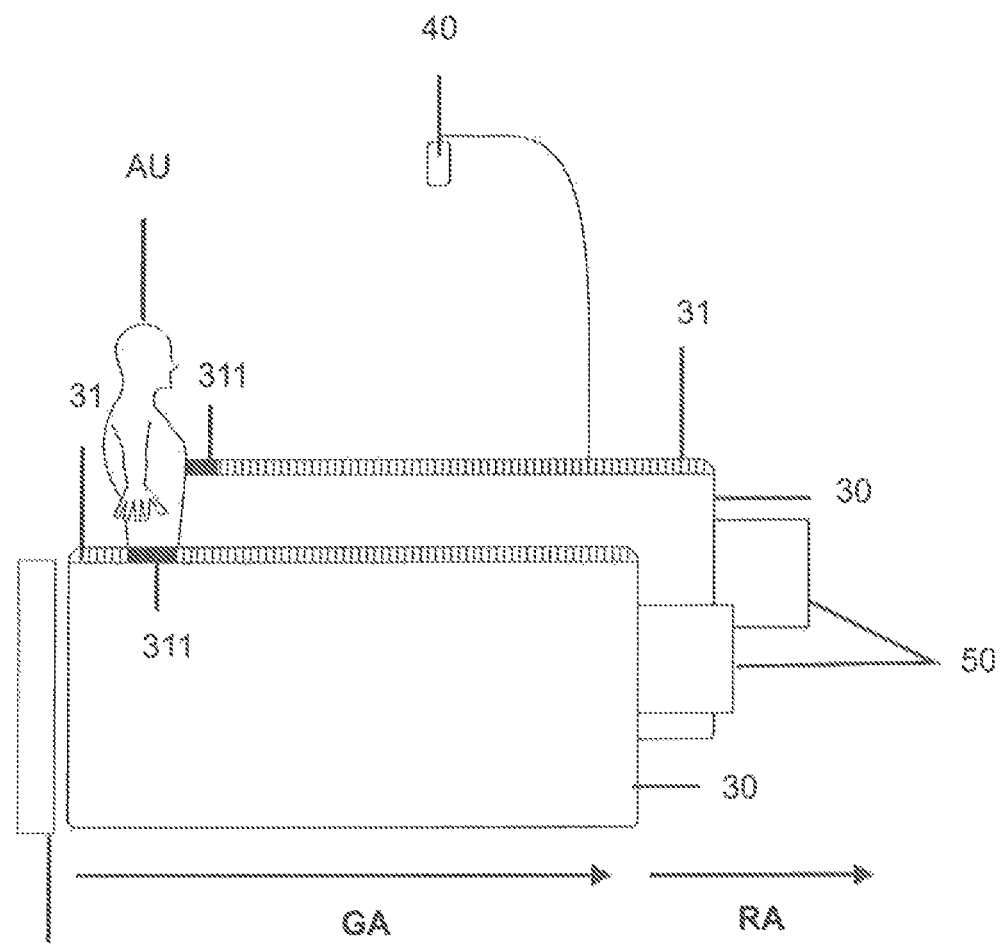
FIG. 4 shows the representation of the movement of an Authorized User (AU) entering the Gated Area (GA), after authorization by a User Authentication Unit (20), with his/her respective User Category Window (311) shown in the color programmed/attributed to identify an Authorized User (AU).
Figure 4A:
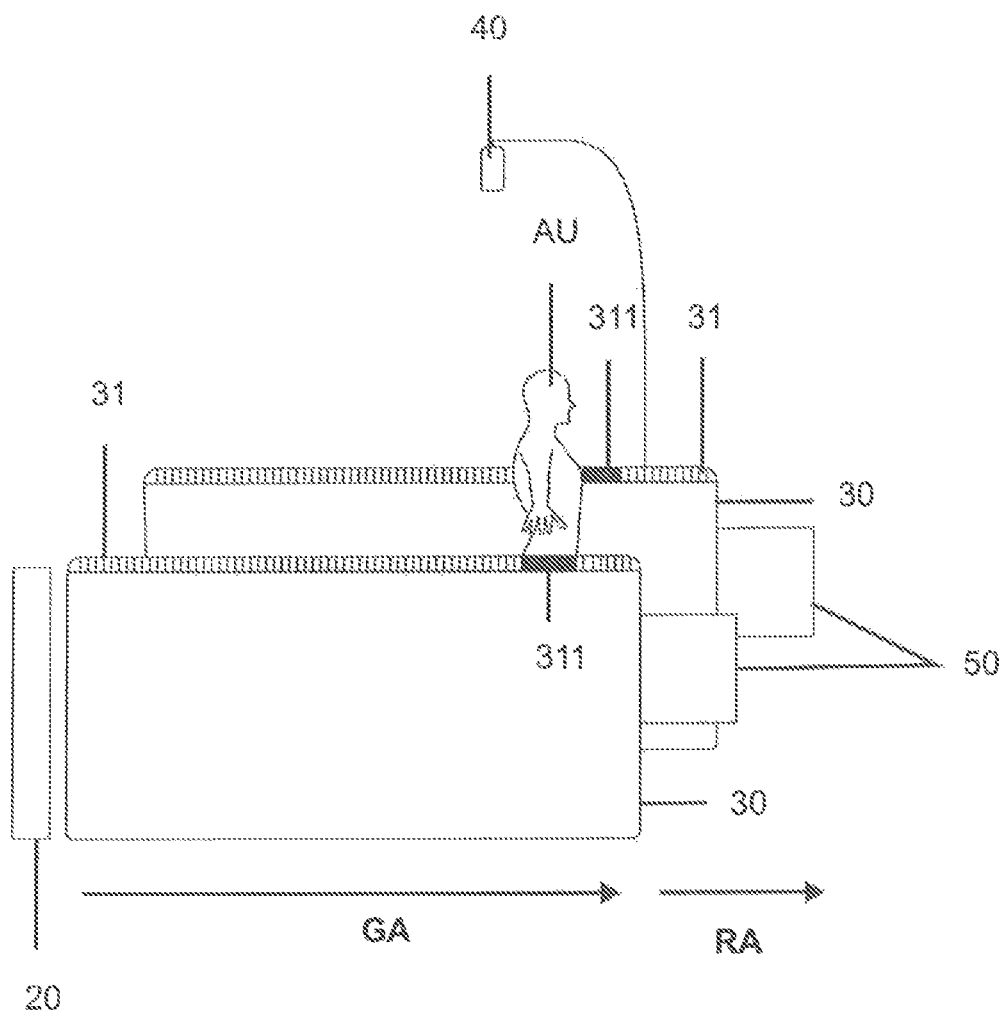
FIG. 4A shows the Authorized User (AU) leaving the Gated Area (GA) and entering the Restricted Area (RA), with the Blocking Device (50) in the open position thereby allowing entry of the Authorized User (AU) into the Restricted Area (RA). The User Category Window (311) follows the movement of the Authorized User (AU) within the Gated Area (GA) until such Authorized User (AU) exits de Gated Area (GA) by either entering the Restricted Area (RA) or moving backwards beyond the User Authentication Device (20).
Figure 5:
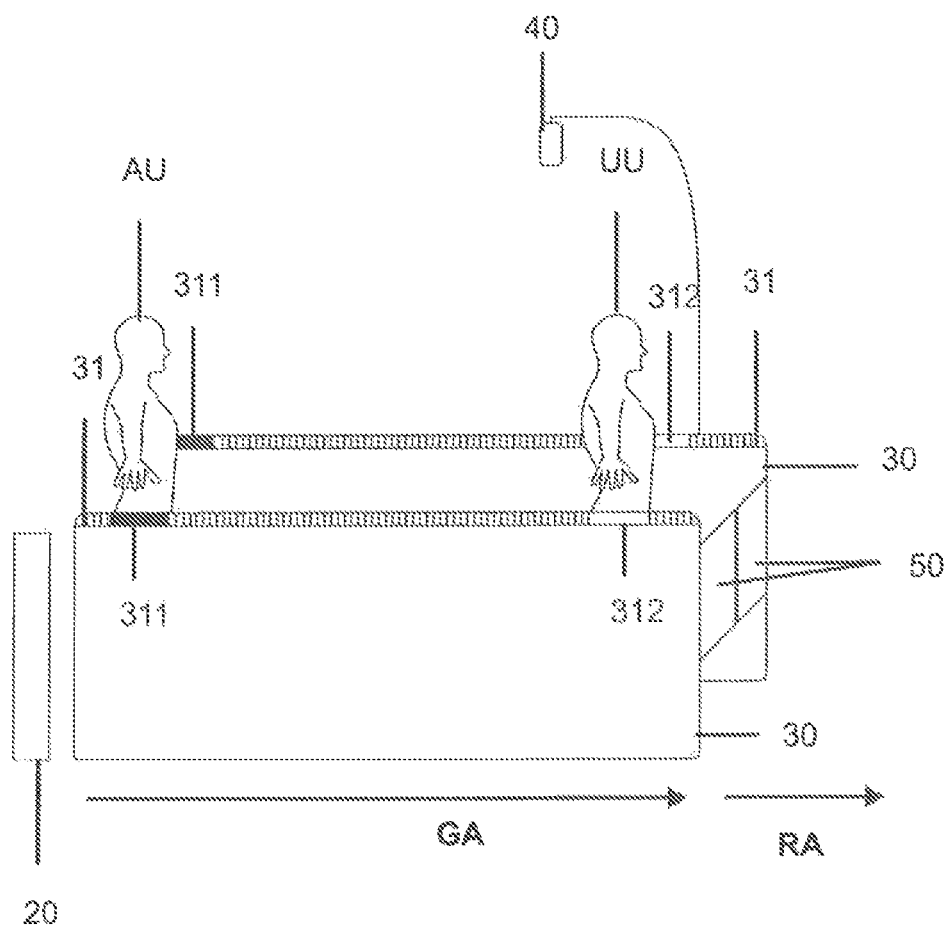
FIG. 5 shows the representation of the movement of an Unauthorized User (UU) with his/her respective User Category Window (312) followed by an Authorized User (AU) with his/her respective User Category Window (311) within the Gated Area (GA), with the Unauthorized User (UU) having his/her entry into the Restricted Area (RA) prevented by the Blocking Device (50), here shown in the closed position.

Preferably, the Barriers (30) provided in the Gated Area (GA) allow the unidirectional movement of Authorized Users (AU), Unauthorized Users (UU) and Special Users (SU) towards the Restricted Area (RA), as shown in FIG. 2.

Figure 7:
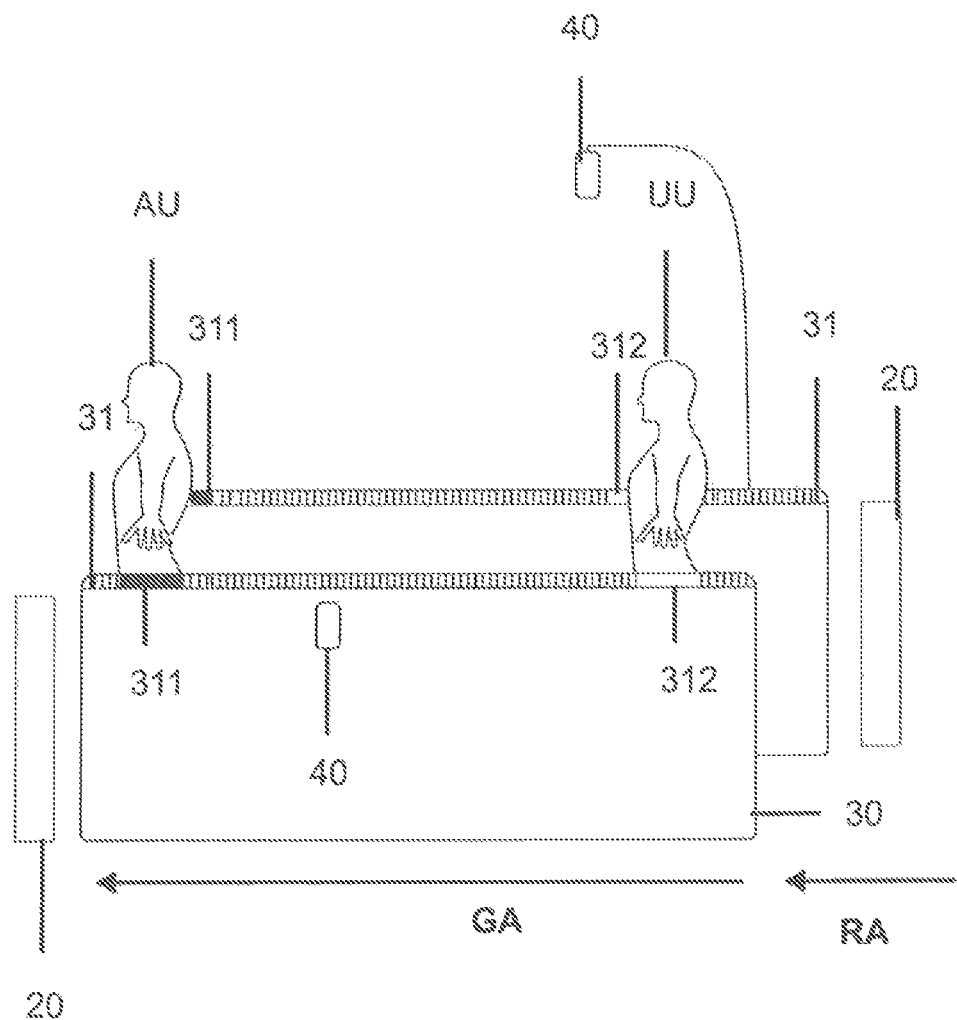
FIG. 7 shows the representation of the movement of an Unauthorized User (UU) and of an Authorized User (AU) for a bidirectional Gated Area (GA), evidencing an additional Image Capture Device (40) positioned in the one of the Barriers (30) as well as an additional User Authentication Device (20), this time located at the frontier between the Gated Area (GA) and the Restricted Area (RA).
Figure 8:
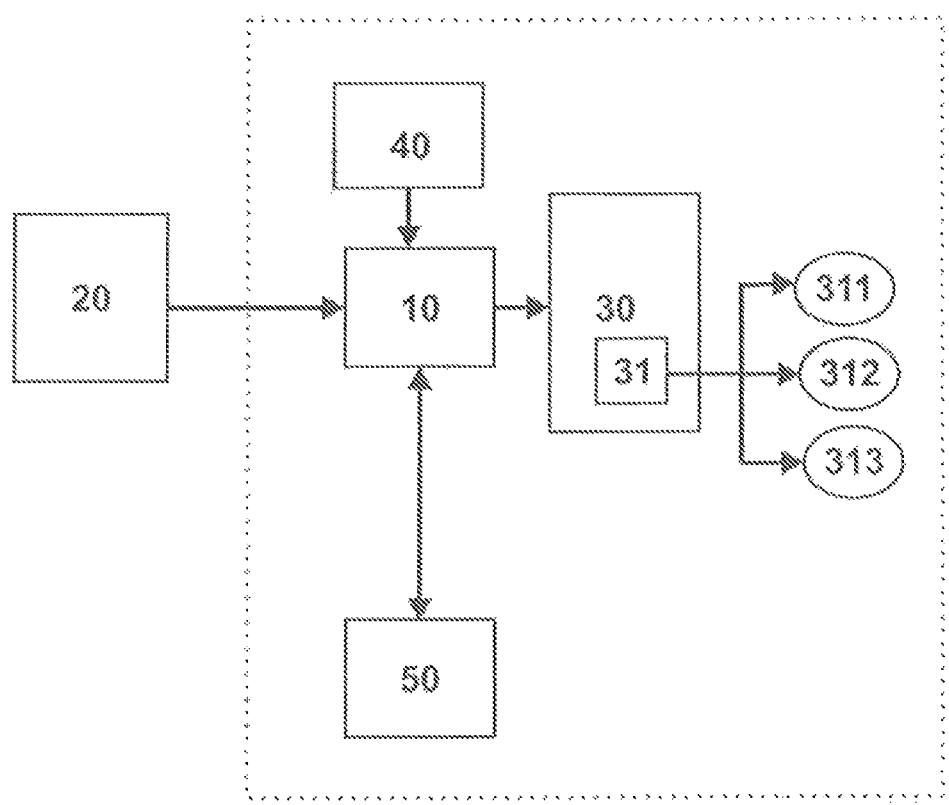
FIG. 8 shows the block diagram of the control and monitoring system for access in restricted areas.
Figure 9:
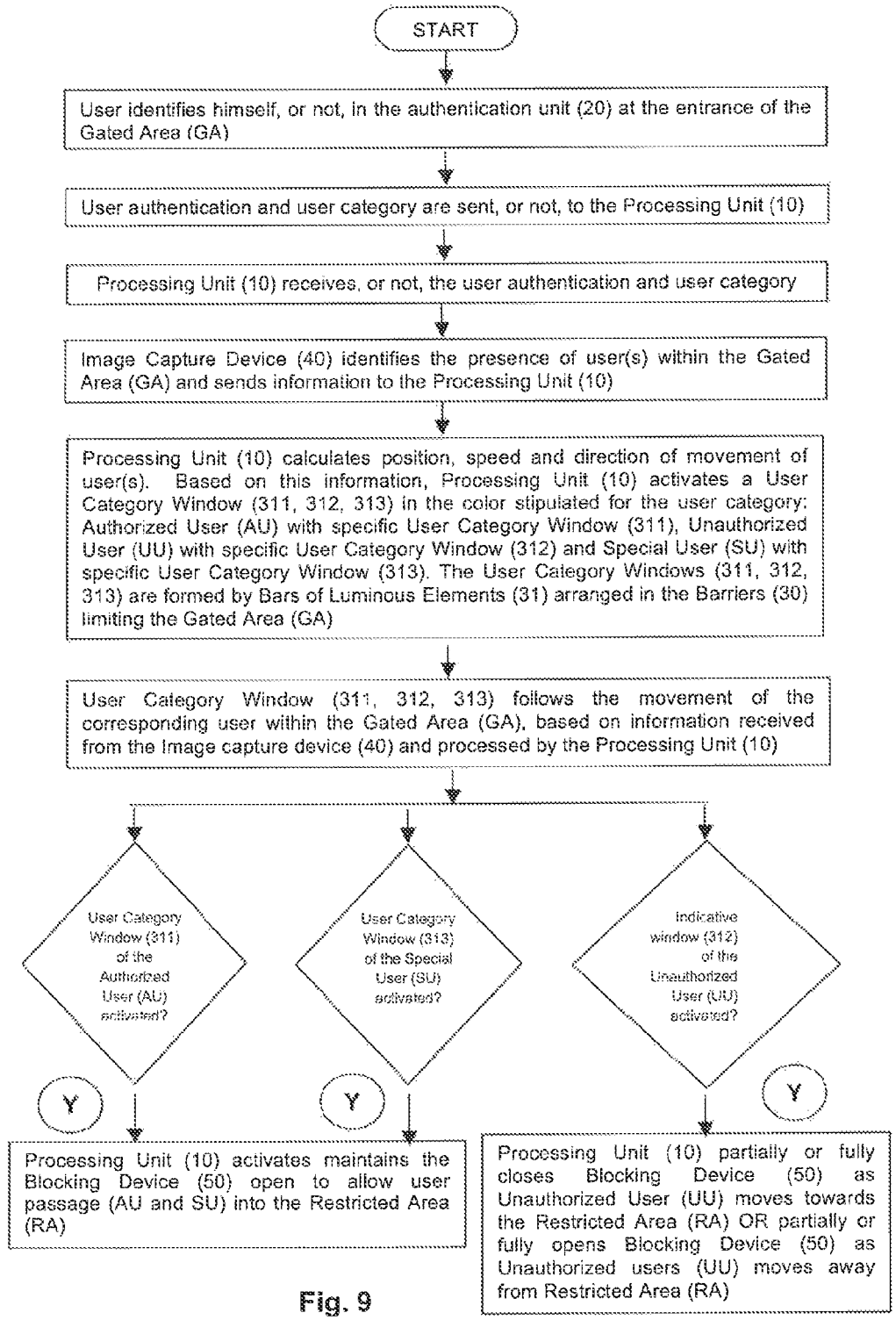
FIG. 9 shows the flowchart of the steps in the control and monitoring method for access in restricted areas.

A bi-directional user flow can be foreseen by placing a second User Authentication Device (20) at the frontier of the Gated Area (GA) with the Restricted Area (RA) and/or an Image Capture Device (40) to configure the corresponding User Category Windows (311, 312 or 313), as shown in FIG. 7.

The Bar Of Luminous Elements (31) can be equipped with light-emitting diodes (LEDs); laser beams; lamps; or luminous displays such as LCDs (Liquid Crystal Displays), plasma, LED, or similar.

The User Category Window (311, 312, 313) moves parallel and together with the movement of the corresponding user within the Gated Area (GA). When a first user overtakes a second user, the first user's User Category Window also overtakes the second user's User Category Window, so that both users' User Category Windows (311, 312, 313) continue aligned with the movement of the respective users, during and after the process of overtaking.

When an Authorized User (AU), Unauthorized User (UU) or Special User (SU) located within the Gated Area (GA) overtakes, by moving forwards or backwards within the Gated Area (GA), any other user (AU, UU or SU), also located within the Gated Area (GA), the corresponding User Category Windows (311, 312, 313) of the overtaking user and that of the overtaken user will continue to follow the corresponding user which has overtaken and the user which has been overtaken, both during and after overtaking has occurred.

The User Authentication Device (20) includes any state of the art device, whose function is the identification of a user, by such means as biometric identification elements (as, for example, iris recognition, facial recognition, fingerprint recognition, finger or palm veins, among others) or non-biometric identification methods (such as badges with magnetic stripe or barcode, including those known as 2D, punch cards, radio-frequency cards, smartcards, among others).

The Image Capture Device (40) monitors and records the presence of static and dynamic objects within the Imaging Area and communicates with the Processing Unit (10), sending data that enables the Processing Unit (10) to calculate the position, speed and direction of movement of one or more users (AU, UU or SU) located within the Gated Area (GA). The result of such calculations is the data needed to activate the Bar of Luminous Elements (31) with the appropriate User Category Window (311, 312 and 313) which follow the corresponding user (AU, UU, SU) as he/she moves within the Gated Area (GA). The Processing Unit (10) can, optionally, provide additional electronic information, such as flow intensity, time of entrance into e out of the Gated Area (GA), user dwell time, etc.

The Image Capture Device (40) can be any device that recognizes a static or dynamic image within an Imaging Area. Examples of such Image Capture Devices (40) include video or thermal cameras, distance capture devices, and other devices that allow the assembly of a representative image of the surroundings within the Imaging Area, including the Gated Area (GA).

The User Category Window (311, 312, 313) that accompanies the movement of the user (Authorized User [AU], Unauthorized User [UU] or Special User [SU]) within the Gated Area (GA) identifies the user category thereby facilitating the identification and category of the user (Authorized User [AU], Unauthorized User [UU] or Special User [SU]) for security agents and/or gatehouse staff to, if necessary, take action. For example, the movement of an Unauthorized User (UU) within the Gated Area (GA) promotes the combined movement of the respective User Category Window (312) for the Unauthorized User (UU) in a color stipulated to such a category, so that the security officers can quickly identify this Unauthorized User (UU) and perform a possible approach or another stipulated procedure.

In a preferred configuration, a Blocking Device (50) is placed at the entrance to the Restricted Area (RA). This Blocking Device (50) is wholly or partially closed by commands from the Processing Unit (10) to prevent the passage of an Unauthorized Users (UU) or certain kinds of Special Users (SU) to the Restricted Area (RA). When Authorized Users (AU) are passing within the Gated Area (GA), the Blocking Device (50) is maintained by the Processing Unit (10) in the open position, thereby allowing the free flow of such users into the Restricted Area (RA).

Optionally, the Blocking Device (50) can be removed. In this case, an Unauthorized User's (UU) access to the Restricted Area (RA) would have to be prevented by security agents based on the visual identification provided by the User Category Window (312) characteristic for an Unauthorized User (UU).

The Blocking Device (50) includes any device usually used to restrict user flows such as turnstiles, blockers, sliding doors, swing gates/doors and the like.

Figure 6:
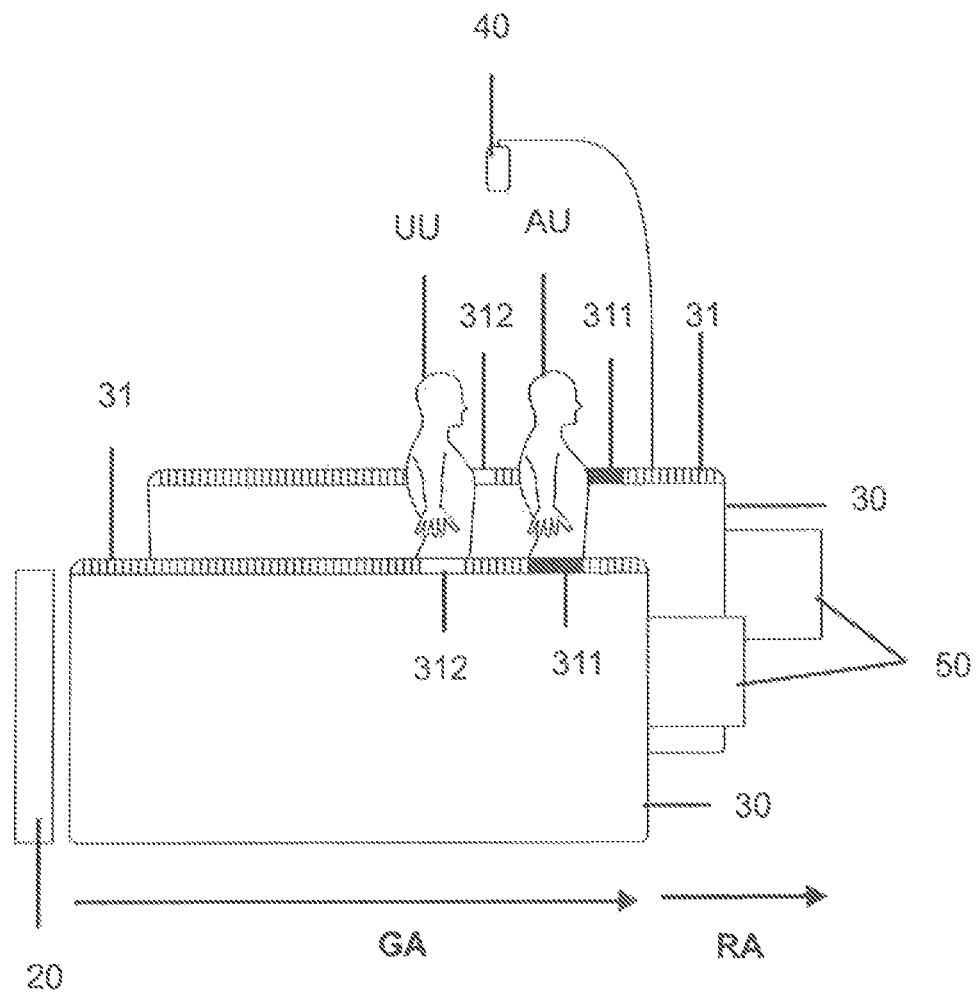
FIG. 6 shows an Authorized User (AU) followed by his/her respective User Category Window (311) entering the Restricted Area (RA), with Blocking Device (50) open allowing passage of the Authorized User (AU). Such Authorized User (AU) is trailed by an Unauthorized User (UU) identified with his/her respective User Category Window (312).

As shown in FIG. 6, when an Unauthorized User (UU) moves into the Gated Area (GA) right behind an Authorized User (AU) or a Special User (SU), the respective User Category Windows (312 for Unauthorized User [UU], 311 for Authorized user [AU] and 313 for Special user [SU]) are activated in the Bar of Luminous Elements (31) of the Barriers (30), in order to signal the category of each one of the users. The Processing Unit (10), based on data received from the Image Capture Device (40) and processed by the Processing Unit (10), activates the Blocking Device (50) which starts to partially close or fully block the flow of an Unauthorized User (UU) as such a user approaches the Blocking Device (50), thereby blocking the passage only for the Unauthorized User (UU) and allowing the entry into the Restricted Area (RA) only for Authorized Users (AU) and Special Users (SU). The closing or opening speed of the Blocking Device (50) can be variable in proportion to the location, speed and direction of movement of an Unauthorized User (UU). For example, as an Unauthorized User (UU) approaches the Restricted Area (RA), the Blocking Device (50) will close more slowly if the Unauthorized User is moving slowly within the Gated Area (GA) and more quickly if the Unauthorized User (UU) moves faster within the gated Area (GA). Conversely, the Blocking Device (50) will start opening more slowly or quickly as the Unauthorized User (UU) moves away from the Restricted Area (RA) at a, respectively, slower or faster pace.

The Processing Unit (10) may also record and store by electronic means any event, based on previously established rules, making it possible, for example, to record the time of entry, speed of entry, dwell time and forced entry attempts by Unauthorized Users (UU), or even identify objects left inside the Gated Area (GA). These events, which are stored for future reference, can also alert security officers, so that they can take appropriate action.

Optionally, the User Authentication Device (20) can be removed, so that the Image Capture Device (40) in conjunction with the Processing Unit (10) can validate an object by way of geometric relationships of features of that object to determine if the object can be authorized, or not, to enter a Restricted Area (RA), thereby activating the Bar of Luminous Elements (31) to configure the respective User Category Window (311, 312 or 313).

Optionally, contiguous to the Gated Area (GA) can be created an area where Unauthorized User (UU) can be quarantined by security agents, thereby avoiding flow restrictions or stoppages in the Gated Area (GA).

Optionally, the control and monitoring system and method for access to a restricted area can be used for counting. In this condition, the User Authentication Device (20), the Blocking Device (50) and the Bar of Luminous Elements (31) in the barrier (30) can be suppressed. As a counter, the Image Capture Device (40) identifies the users passage through the Gated Area (GA) and the Processing Unit (10) performs the counting functions.

Optionally, the control and monitoring system and method for access to a restricted area can be used for animal sorting, categorizing by physical attributes, through recognition or identification devices, such as, but not limited to, earrings with bar codes, among others. In this situation, the Image Capture Device (40) identifies the animal through, for example, the reading of an earring identifier, and sends a signal to the Processing Unit (10) that triggers the respective indicative window stipulated for its category, following the movement of the animal within the Gated Area (GA), allowing the identification of, for example, females/males, vaccinated/unvaccinated animals, and other conditions. Depending of the category of animal identified, the Blocking Device (50), can be used to divert such animals into their respective segregation areas, according rules previously programmed in the Processing Unit (10).

The invention claimed is:

1. A system for monitoring access to a Restricted Area (RA), comprising:
    a Gated Area (GA) having a lateral bound on a side demarcated by a barrier (30) equipped with a Bar of Luminous Elements (31), the Gated Area (GA) positioned before the Restricted Area (RA), entry to which is allowed for Authorized Users (AU) but is restricted from Unauthorized Users (UU);
    a Blocker (50) between the Gated Area (GA) and the Restricted Area (RA), the Blocker (50) being for allowing access to the Restricted Area (RA) for Authorized Users (AU) and being for preventing access to the Restricted Area (RA) for Unauthorized Users (UU), the Blocker (50) being normally open so as to allow access;
    an Image Capturer (40) configured to:
        capture images in an imaging area including the Gated Area (GA) and constantly identify a presence and data representing a location of one or more users in the Gated Area (GA); and
        transmit the data representing the presence and location of one or more users in the Gated Area (GA) to a Processing Unit (10);
    a User Authenticator (20) for determining a user category type of the user in the Gated Area (GA) chosen from an Authorized User (AU) type or an Unauthorized User (UU) type using biometric or non-biometric identification, the User Authenticator (20) being configured to send the user category type to the Processing Unit (10);
    the Processing Unit (10) is configured to:
        calculate the location, speed, and direction of one or more users in the Gated Area (GA) simultaneously,
        activate, when the user is an Authorized User (AU) type, a first user category window (311) which corresponds to following the position of the Authorized User (AU) in the Gated Area (GA) in a first color, in at least some but not all of the Luminous Elements (31), and send commands to the Blocker (50) to open, if closed, so as to allow access to the Restricted Area (RA) for Authorized Users (AU); and
        activate, when the user is an Unauthorized User (UU) type, a second user category window (312) which corresponds to following the position of the Unauthorized User (UU) in the Gated Area (GA) in a second color, in at least some but not all of the Luminous Elements (31), and send commands to the Blocker (50) to wholly or partially close so as to prevent access to the Restricted Area (RA) for Unauthorized Users (UU),
    wherein the second color differs from the first color.

2. The system of claim 1, wherein
    entry to the Restricted Area (RA) is allowed for Special Users (SU);
    the Blocker (50) being for allowing access to the Restricted Area (RA) for Special Users (SU);
    the Image Capturer (40) is configured to constantly identify a presence and data representing a location of the Special User (SU), wherein the Image Capturer (40) transmits the data representing the presence and the location, of the Special User (SU) in the Gated Area (GA) to a Processing Unit (10);
    a User Authenticator (20) for determining a user category type of the user in the Gated Area (GA) chosen from an Authorized User (AU) type, an Unauthorized User (UU) type, or a Special User (SU) type using biometric or non-biometric identification, the User Authenticator (20) being configured to send the user category type to the Processing Unit (10); and
    the Processing Unit (10) is configured to:
        calculate the location, speed, and direction of the Special User (SU) in the Gated Area (GA),
        activate a third user category window (313) which corresponds to following the position of the Special User (SU) in the Gated Area (GA) in a third color, in at least some but not all of the luminous elements (31), and send commands to the Blocker (50) to open, if closed, so as to allow access to the Restricted Area (RA) for Special Users (SU),
    wherein the third color differs from both the first color and the second color.

3. A method of monitoring access to a Restricted Area, using the system of claim 2, comprising:
    capturing images, with the Image Capturer (40), in an Imaging Area including the Gated Area (GA) and constantly identifying a presence and data representing a location of a user in the Gated Area (GA); and
    transmitting, via the Image Capturer (40), the data representing the presence and location of the user in the Gated Area (GA) to a Processing Unit (10);
    determining, with the User Authenticator (20), the user category type of the user in the Gated Area (GA) chosen from an Authorized User (AU) type or an Unauthorized User (UU) type using biometric or non-biometric identification, sending, with the User Authenticator (20), the user category type to the Processing Unit (10);

calculating, with the Processing Unit (10), the location, speed, and direction of the user(s) in the Gated Area (GA), activating, with the Processing Unit (10), when the user is an Authorized User (AU) type, a first User Category Window (311) which corresponds to following the position of the Authorized User (AU) in the Gated Area (GA) in a first color, in at least some but not all of the Luminous Elements (31), and send commands to the Blocker (50) to open, if closed, so as to allow access to the Restricted Area (RA) for Authorized Users (AU); and activating, with the Processing Unit (10), when the user is an Unauthorized User (UU) type, a second User Category Window (312) which corresponds to following the position of the Unauthorized User (UU) in the Gated Area (GA) in a second color, in at least some but not all of the Luminous Elements (31), and send commands to the Blocker (50) to wholly or partially close so as to prevent access to the Restricted Area (RA) for Unauthorized Users (UU).

4. The method of claim 3, wherein at least one Authorized User (AU) and at least one Unauthorized User (UU) are moving in the Gated Area (GA) at the same time.

5. A method of monitoring access to a Restricted Area (RA), using the system of claim 2, comprising:

capturing images, with the Image Capturer (40), in an Imaging Area including the Gated Area (GA) and constantly identifying a presence and data representing a location of a user in the Gated Area (GA); and transmitting, via the Image Capturer (40), the data representing the presence and location of the user in the Gated Area (GA) to a Processing Unit (10);

determining, with the User Authenticator (20), the user category type of the user in the Gated Area (GA) chosen from an Authorized User (AU) type or a Special User (SU) type using biometric or non-biometric identification, sending, with the User Authenticator (20), the user category type to the Processing Unit (10);

calculating, with the Processing Unit (10), the location, speed, and direction of the user(s) in the Gated Area (GA), activating, with the Processing Unit (10), when the user is an Authorized User (AU) type, a first user category window (311) which corresponds to following the position of the Authorized User (AU) in the Gated Area (GA) in a first color, in at least some but not all of the Luminous Elements (31), and send commands to the Blocker (50) to open, if closed, so as to allow access to the Restricted Area (RA) for Authorized Users (AU);

activating, with the Processing Unit (10), when the user is an Special User (SU) type, a second user category window (312) which corresponds to following the position of the Special User (SU) in the Gated Area (GA) in a second color, in at least some but not all of the Luminous Elements (31), and send commands to the Blocker (50) to wholly or partially close so as to prevent access to the Restricted Area (RA) for Unauthorized Users (UU);

constantly identifying, with the Image Capturer (40), a presence and data representing a location of the Special User (SU), transmitting, with the Image Capturer (40), the data representing the presence and the location, of the Special User (SU) in the Gated Area (GA) to a Processing Unit (10);

determining, with the User Authenticator (20), a user category type of the user in the Gated Area (GA) chosen from an Authorized User (AU) type, an Unauthorized User (UU) type, or a Special User (SU) type using biometric or non-biometric identification, sending, with the User Authenticator (20), the user category type to the Processing Unit (10);

the Processing Unit (10) is configured to:
calculating, with the Processing Unit (10), the location, speed, and direction of the Special User (SU) in the Gated Area (GA), activating, with the Processing Unit (10), a third User Category Window (313) which corresponds to following the position of the Special User (AU) in the Gated Area (GA) in a third color, in at least some but not all of the Luminous Elements (31), and sending, via the Processing Unit (10), commands to the Blocker (50) to open, if closed, so as to allow access to the Restricted Area (RA) for Special Users (SU).

6. The method of claim 5, wherein at least one Authorized User (AU) and at least one Unauthorized User (UU) are moving in the Gated Area (GA) at the same time.

7. The method of claim 5, wherein at least one Authorized User (AU) and/or one Unauthorized User (UU) and/or one Special User (SU) are moving in the Gated Area (GA) at the same time.

8. The system of claim 1, wherein the luminous elements (31) are equipped with light-emitting diodes (LEDs); laser beams; lamps; or luminous displays of the LCD (Liquid Crystal Display).

9. The system of claim 1, wherein the User Authenticator (20) uses biometric identification selected from fingerprints, irises, faces, and palms of the hand.

10. The system of claim 1, wherein the User Authenticator (20) uses non-biometric identification selected from magnetic stripes of barcode badges, RFID badges and tags.

11. The system of claim 1, wherein the Image Capturer (40) is chosen from video cameras, thermal cameras, or three dimensional imaging systems/cameras.

12. The system of claim 1, wherein the Blocker (50) is configured to partially or fully close at a variable speed depending upon (a) the speed of the Unauthorized User (UU) within the Gated Area (GA) while moving in a direction toward the Restricted Area (RA) and (b) the position of the Unauthorized User (UU) within the Gated Area.

13. The system of claim 1, wherein the Blocker (50) is configured to partially or fully open at a variable speed depending upon (a) the speed of the Unauthorized User (UU) within the Gated Area (GA) while moving in a direction away from the Restricted Area (RA) and (b) the position of the Unauthorized User (UU) within the Gated Area.

14. The system of claim 1, wherein the Image Capturer (40) in conjunction with the Processing Unit (10) are configured to validate an object by way of geometric relationships of features of that object to determine if the object can be authorized, or not, to enter the Restricted Area (RA), and thereby activate the Luminous Elements (31).

* * * * *